US010875816B2

(12) United States Patent
Duarte et al.

(10) Patent No.: US 10,875,816 B2
(45) Date of Patent: Dec. 29, 2020

(54) COMPOSTING BIN FOR FACILITATING BREAKDOWN OF ORGANIC MATERIAL

(71) Applicant: WIMBY Detroit, LLC, Clarkston, MI (US)

(72) Inventors: Camila C. Duarte, Clarkston, MI (US); Fai Y. Foen, Berkley, MI (US)

(73) Assignee: WIMBY DETROIT, LLC, Clarkston, MI (US)

( * ) Notice: Subject to any disclaimer, the term of this patent is extended or adjusted under 35 U.S.C. 154(b) by 136 days.

(21) Appl. No.: 15/088,007

(22) Filed: Mar. 31, 2016

(65) Prior Publication Data

US 2017/0283336 A1  Oct. 5, 2017

(51) Int. Cl.
| | | |
|---|---|---|
| C05F 17/00 | (2020.01) | |
| C12M 3/00 | (2006.01) | |
| C05F 17/05 | (2020.01) | |
| C05F 17/907 | (2020.01) | |
| C05F 17/964 | (2020.01) | |

(52) U.S. Cl.
CPC ............ *C05F 17/05* (2020.01); *C05F 17/907* (2020.01); *C05F 17/964* (2020.01); *Y02P 20/145* (2015.11); *Y02W 30/40* (2015.05)

(58) Field of Classification Search
CPC ....... C12M 21/04; C12M 23/34; C12M 29/02
See application file for complete search history.

(56) References Cited

U.S. PATENT DOCUMENTS

| | | | | | |
|---|---|---|---|---|---|
| 4,108,609 A | * | 8/1978 | Petzinger | ............... | A01C 3/021 220/501 |
| 5,118,005 A | * | 6/1992 | Onodera | ................. | B65F 1/004 220/501 |
| D332,163 S | | 12/1992 | Appelhof | | |

(Continued)

FOREIGN PATENT DOCUMENTS

| | | |
|---|---|---|
| AU | 199341321 A1 | 12/1993 |
| DE | 29516160 U1 | 12/1995 |

(Continued)

OTHER PUBLICATIONS

Prototype shared to a class at LTU Innovation Corps program by inventors on Apr. 11, 2015. (Photograph attached hereto as "NPL Ref").

*Primary Examiner* — Nathan A Bowers
(74) *Attorney, Agent, or Firm* — Wayne State University Patent Procurement Clinic

(57) ABSTRACT

A composting bin for breaking down organic material includes a container having an interior and an opening. The interior includes a plurality of regions, including a first region and a second region. The first region and the second region are configured to support decomposable organic material. In operation, a user positions decomposable organic material in, for example, the first region. The user then provides a composting animal in the first region. The user covers the composting bin to inhibit light from entering the composting bin. Upon completion of the composting process, the user causes the composting animal to move (Continued)

from the first region to the second region. The user causes the composting animal to move from the first region to the second region by allowing light to enter the first region, and/or providing food in the second region while denying food in the first region.

20 Claims, 2 Drawing Sheets

(56) References Cited

U.S. PATENT DOCUMENTS

| | | | |
|---|---|---|---|
| 5,611,270 A * | 3/1997 | Harrington | B30B 9/323 |
| | | | 100/102 |
| 2003/0059931 A1 | 3/2003 | Gitt | |
| 2003/0157702 A1 * | 8/2003 | Bard | C05F 17/0205 |
| | | | 435/290.4 |
| 2010/0273251 A1 | 10/2010 | Rhoads et al. | |
| 2012/0244611 A1 * | 9/2012 | Branham | C05F 17/0009 |
| | | | 435/290.1 |
| 2012/0317881 A1 * | 12/2012 | Thirumalai Anandampillai et al. | A01G 9/02 |
| | | | 47/66.5 |
| 2013/0118410 A1 | 5/2013 | Berkson | |

FOREIGN PATENT DOCUMENTS

| | | |
|---|---|---|
| EP | 1657229 A3 | 10/2009 |
| SE | 466752 B | 3/1992 |

* cited by examiner

COMPOSTING BIN FOR FACILITATING BREAKDOWN OF ORGANIC MATERIAL

BACKGROUND

As society becomes increasingly more aware of climate change, greenhouse gases, and the effects waste management has on society as a whole, composting is becoming increasingly popular.

Many composting bins are essentially boxes that store decomposable organic material. These composting bins often make it difficult to harvest the compost when the composting process is complete. Composting animals remain comingled in the compost, and the harvester must sift out the composting animals to harvest the compost.

SUMMARY

In one example, an apparatus for facilitating breakdown of organic material is disclosed. The apparatus includes a container and a cover. The container includes an interior and an opening for access to the interior. The interior includes a first region and a second region. The first and second regions are configured to contain decomposable organic material. The cover is attachable to the container. The cover is sized to inhibit light to the interior. The cover is configured to selectively allow light to at least one of the first and second regions responsive to decomposition of the decomposable organic material.

In another example, an apparatus for facilitating breakdown organic material is disclosed. The apparatus includes an interior wall. The apparatus also includes one or more partition walls dividing the interior into a plurality of regions. Each region is bound by the interior wall and at least one of the one or more partition walls. Each of the partition walls include it least one aperture sized to permit a composting animal to pass therethrough.

In another example, a method of causing a composting animal to migrate upon completion of composting is disclosed. The method includes providing decomposable organic material in a first region of an interior of a container. The method further includes providing the composting animal in the first region. The method further includes covering at least the first region to inhibit light from entering at least the first region for facilitating decomposition. Upon completion of decomposition of at least some of the decomposable organic material, the method includes causing the composting animal to migrate from the first region to an adjoining region.

DETAILED DESCRIPTION

Figure 1:
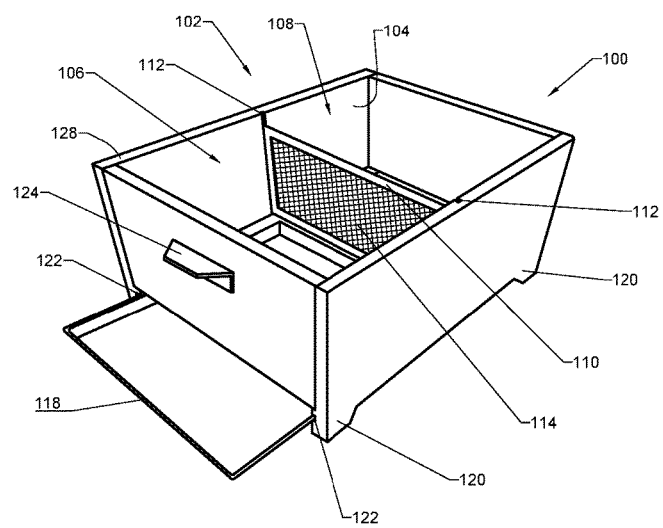
FIG. 1 is a perspective view of an exemplary container for composting decomposable organic material.

The present disclosure provides a composting bin for breaking down organic material. The composting bin includes a container having an interior and an opening. The interior includes a first region and a second region. The first region and the second region are configured to support decomposable organic material. In operation, a user positions decomposable organic material in, for example, the first region. The user then positions a composting animal in the first region. The user then covers the composting bin to inhibit light from entering the composting bin. Upon the completion of the composting process via the composting animal, the user causes the composting animal to move from the first region to the second region. The user can cause the composting animal to move from the first region to the second region by exposing the first region to light. Additionally or alternatively, the user can cause the composting animal to move from the first region to se second region by providing decomposable organic material in the second region, while denying decomposable organic material in the first region. Such an arrangement provides the user with an easier, cleaner harvesting process.

Detailed examples are disclosed herein; however, it is to be understood that the disclosed examples are intended only to facilitate the description. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-4C, but the examples are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the examples described herein may be practiced without these specific details.

Referring now to FIG. 1, a perspective view of a container 100 is shown. The container 100 includes an interior 102 and an opening 128. Exemplary materials used in forming the container 100 includes, for example, wood, plastic, metal, composites, or other generally rigid materials.

The interior 102 is defined by an interior wall 104. The interior 102 includes a plurality of regions. As shown in FIG. 1, the interior includes a first region 106 and an adjacent second region 108. Although two regions are shown in FIGS. 1-4C, it should be understood that the interior 102 may include any number of regions. The plurality of regions are configured to support decomposable organic material. The plurality of regions are laterally aligned with one another.

In one or more arrangements, the interior 102 of the container 100 may include a partition 110. In the example shown in FIG. 1, the partition 110 may separate the first region 106 and the second region 108. Although not shown, where there are more than two regions, the interior 102 may further include additional partitions separating the regions from adjoining additional regions. The partition 110 may be selectively attachable to the interior 102 of the container 100. Where the partition 110 is included, the first region 106 and second region 108 may be bound and defined by the interior wall 104 and the partition 110. Exemplary materials used in forming the partition 110 includes, for example, wood, plastic, metal, composites, or other generally rigid materials. Additionally or alternatively, the partition 110 can be constructed in two parts. For example, the perimeter of the partition 110 can include a rigid structure, and the interior of the partition 110 can be a mesh structure. The mesh structure of the partition may have one or more apertures sized to permit composting animals to move from one region to an adjoining region. Exemplary partitions 110 can be similar in construction to screened doors.

In one example, the interior wall 104 may include opposing notches 112. The opposing notches 112 may be positioned on opposing walls on the interior wall 104 of the container 100. The opposing notches 112 may be substantially aligned with one another. The partition 110 may slideably engage the opposing notches 112. The opposing notches 112 maintain the partition 110 in a substantially upright orientation relative to the interior 102 of the container 100. Although this example is provided, many other ways of maintaining the partition 110 in an upright position can be included. For example, the partition 110 may be fastened to the container 100, the interior wall 104 may include a locking mechanism for maintaining the upright orientation of the partition 110, etc.

The partition 110 may include at least one aperture 114. The aperture 114 may be sized to permit a composting animal (not shown) to pass therethrough. In one or more examples, the composting animal can be a worm. In one example, the species of worm may be an *Eisenia Foetida* (a.k.a. Red Wiggler). However, other types of worms may be used as the composting animal. Additionally or alternatively, the composting animal can be any other type of composting animal generally known to aid in the decomposition of organic material.

Figure 2:
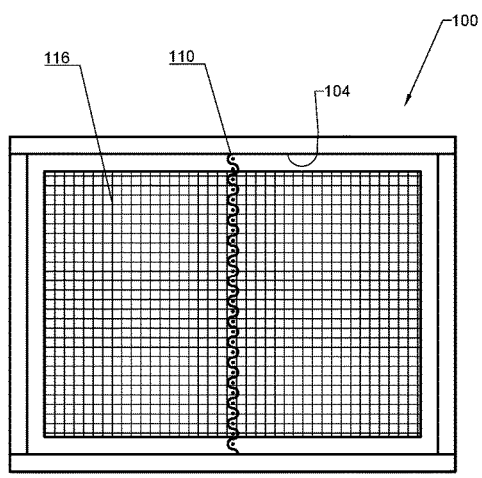
FIG. 2 is a top view of the exemplary container of FIG. 1.

Referring now to FIG. 1 and FIG. 2, the container 100 may include a screen 116. The screen 116 may define the base of the interior 102. Accordingly, in this example, the interior 102 is bound and defined by the interior wall 104 and the screen 116. The screen 116 is configured to support the weight of decomposable organic material positioned in the interior 102 of the container 100. The screen 116 can be constructed in two parts. For example, the perimeter of the 116 can include a rigid structure, and the interior of the screen 116 can be a mesh structure. Exemplary screens 116 can be similar in construction to screened doors. The rigid structure, for example, may be fastened to the interior wall 104 of the container 100. The mesh structure can include at least one aperture sized to permit fluid to pass therethrough.

The container 100 may further include a drip pan 118. The drip pan 118 may receive fluid from the interior 102 of the container 100. The drip pan 118 may be positioned subjacent the interior 102 of the container 100. Additionally, the drip pan 118 may be spaced apart from the base of the interior 102 of the container 100 to permit airflow into the interior 102 of the container. In one example, the container 100 may include legs 120. The legs 120 may support the container 100 and its contents (e.g., decomposable organic material, composting animals, etc.). The legs 120 may include opposing notches 122. The opposing notches 122 can permit the legs to receive and support the drip pan 118. In this example, the drip pan 118 slideably engages the notches 122, and is supported beneath the container 100. In arrangements where the container 100 includes the screen 116, fluid can move from the interior 102, through the mesh structure of the screen 116, and to the drip pan 118. Additionally, air can pass from the exterior of the container 100, through the space between the drip pan 118 and the screen 116, and into the interior 102. Although this example of supporting the drip pan 118 is provided, many other examples may be used for aligning and supporting the drip pan 118 beneath the interior 102 of the container 100.

Additionally or alternatively, each of the regions may have a corresponding drip pan. For example, in the container 100 shown in FIG. 1, the first region 106 can have a corresponding drip pan positioned beneath it, and the second region 108 can have a corresponding drip pan positioned beneath it. Likewise, in one or more examples, each of the first and second region 106, 108 can have corresponding screens 116.

The container 100 may further include one or more handles 124. The one or more handles 124 may be positioned on opposing outer walls of the container 100. The one or more handles 124 may be used by a user for transporting or moving the container 100.

Figure 3:
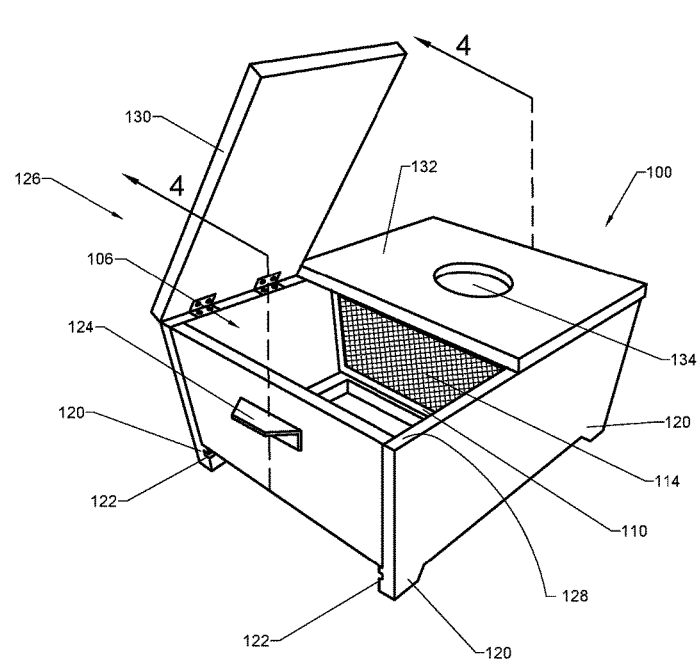
FIG. 3 is a perspective view of the exemplary container of FIG. 1 including a cover.

Referring now to FIG. 3, a perspective view of the container 100 is shown. The container 100 can further include a cover 126. The cover 126 selectively engages the opening 128 of the container 100. The cover 126 may be attachable to the container 100. The cover 126 may be sized to inhibit light to the interior 102 of the container 100. As shown in FIG. 3, the cover 126 may span substantially all of the opening 128 of the container 100. The cover 126 may be rotatably attached to the interior wall 104 of the container 100. Although this example is provided, the cover 126 may be selectively attached to the container 100 by a number of different ways.

The cover 126 may include a first cover 130 and a second cover 132. The first cover 130 may correspond to the first region 106, and the second cover 132 may correspond to the second region 108. The first cover 130 and the second cover 130 may be selectively removable to cover the first region 106 and the second cover 108, respectively. In one or more arrangements, the first cover 130 may be pivotally attached to the interior wall 104 of the container 100 at a position to permit selective covering of the first region 106. In this example, the second cover 132 may also be pivotally attached to the interior wall 104 of the container 100 at a position to permit selective covering of the second region 108. As such, each of the first cover 130 and second cover 132 are configured to selectively permit and/or inhibit light to enter the interior 102 of the container 100 at their respective regions 106, 108. Although this example is provided for showing the cover 126 selectively permitting light to enter the interior 102 at a region, many other examples may be used such as slideable (e.g., a sliding portion, and/or blinds) covers, rotatable covers, or other covers that will selectively allow light to enter a region while blocking light from entering one or more adjoining regions.

The cover 126 can further include a cutout region 134. The cutout region 134 can be sized to support a gardening pot (not shown) in an upright position. Where the cutout region 134 is included, the container 100 can further include a cutout cover (not shown) for selectively engaging the cutout region 134. The cutout cover can seal the cutout region 134 when the gardening pot is not engaging and being supported by the cutout region 134.

Figure 4A:
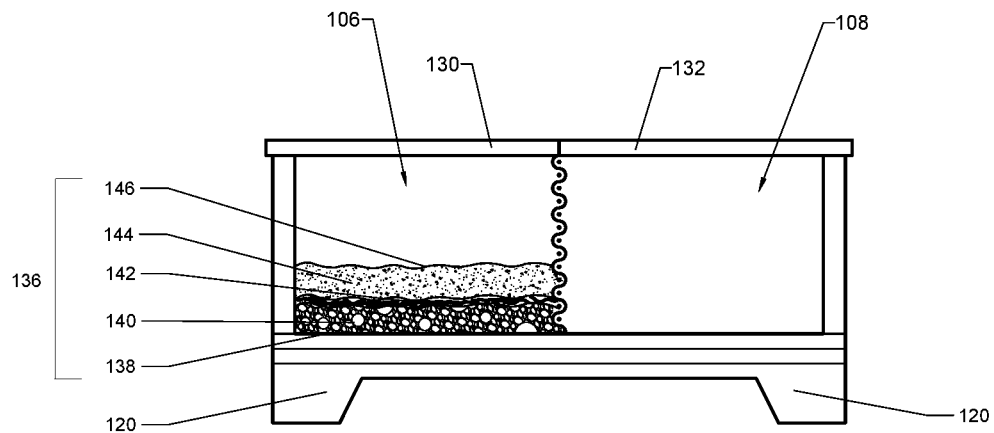
FIG. 4A-FIG. 4C are a method of using the exemplary container of FIG. 1.
Figure 4B:
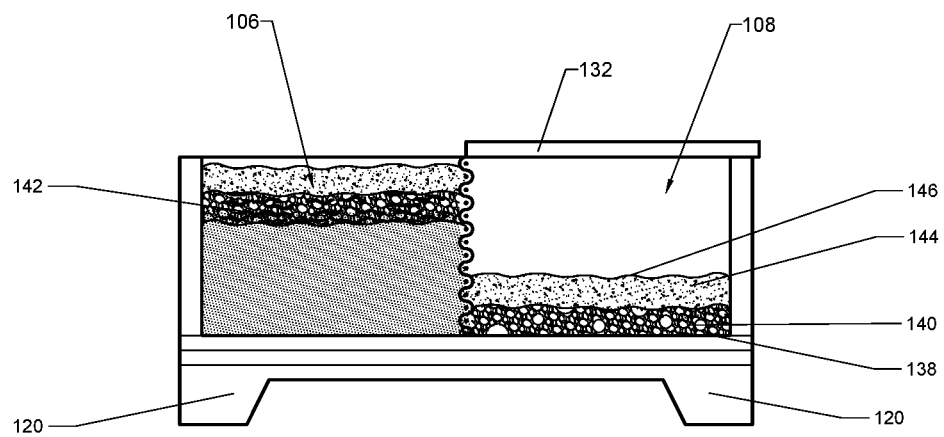
Figure 4C:
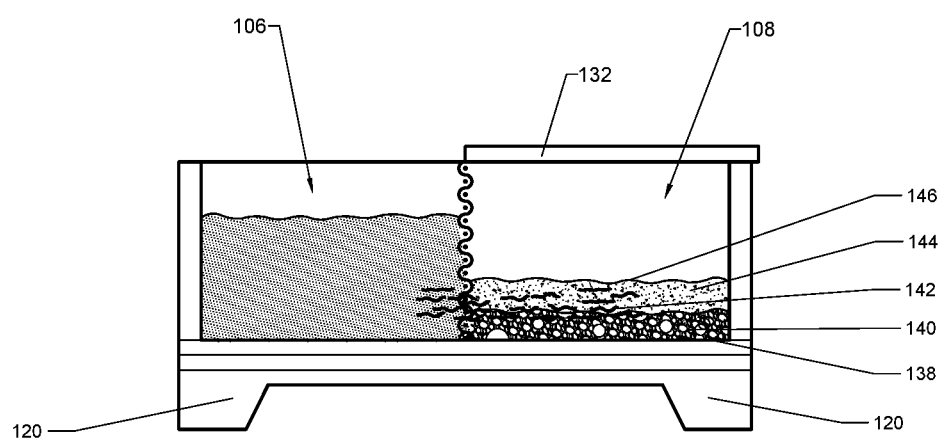

The following example is provided with reference to FIGS. 4A-4C for purposes of illustrating an exemplary use of the composting bin provided herein. However, it should be understood that the present disclosure should not be limited to this example, and that many variations of this example are contemplated. Such variations could include, for example, adding additional steps or removing one or more of the provided steps.

With reference to FIG. 4A, a user may arrange the decomposable organic material 136 in, for example, the first region 106. In one or more arrangements, the decomposable organic material 136 can be layers of different materials. As shown in FIG. 4A, the decomposable organic material can include a bottom layer of newsprint 138, a layer of food scraps 140, a layer of composting animals 142, a layer of bedding 144, and a top layer of newsprint 146. In one or more arrangements, the bedding 144 and layers of newsprint 138, 146 may be dampened. In the examples shown in FIGS. 4A-4C, several composting animals are positioned on top of the bedding. As shown in FIG. 4A, the second region 108 in this example is empty. Although this exemplary arrangement of newsprint 138, food scraps 140, composting animals 142, and bedding 144 is shown, many other arrangements of decomposable organic material 136 may be used in the container 100. Accordingly, the present disclosure should not be limited to the example provided, and should encompass many variations of materials and arrangements commonly used in the composting process.

The user then applies the cover 126 to the container 100, thus inhibiting light from entering the interior 102 of the composting bin. Over time, the composting animals 142 will begin to aid in the break-down of the food scraps 140. The user may add additional food scraps 140 as necessary. To do so, the user will remove the top layer of newsprint 146 and bedding 144, add additional food scraps 140, and reapply the bedding 144 and newsprint 146. When the composting process is complete (shown in FIG. 4B), the user may begin the harvesting process of the compost.

The user causes the composting animals 142 to move from the first region 106 to the second region 108. The user may cause the composting animal to move, for example, using two different methods. In one example, the user can add the layers described above (e.g., newsprint 138, 146, food scraps 140, bedding 144) to the second region 108, while denying any additional food scraps 140 to the first region 106. In this example, the composting animal 142 may naturally migrate to the second region 108 from the first region 106.

Additionally or alternatively, the user can add the layers described above (e.g., newsprint 138, 146, food scraps 140, bedding 144) to the second region 108, inhibit light from entering the second region 108, while allowing light to enter the first region 106. In this example, the composting animals 142 may be attracted to the food scraps 140 and the shade in the second region 108, and naturally migrate to the second region 108 from the first region 106. In this example, the arrangement of the cover 126 inhibits light to the interior 102 of the container 100, and is configured to selectively allow light to at least one (e.g., the first region 106) of the plurality of regions (e.g., the first region 106 and the second region 108). The cover 126 is configured to selectively allow light to enter the first region 106 by, for example, including two covers 130, 132 being rotatably attached to the interior wall 104 of the container 100, or by the other means described above with reference to the cover 126.

Aspects herein may be embodied in other forms without departing from the spirit or essential attributes thereof. Accordingly, reference should be made to the following claims, rather than to the foregoing specification, as indicating the scope of the invention.

What is claimed is:

1. An apparatus for facilitating breakdown of organic material comprising:
   a container including an interior and an opening for access to the interior, the interior including a first region and a second region, the first region and second region arranged side-by-side, the first and second regions configured to contain decomposable organic material;
   a mesh partition separating one of the first or second regions from another region, the partition comprising a frame forming a perimeter of the partition and a mesh screen disposed within the frame and forming an interior of the partition
   a screen disposed at the bottom of the first region or second region and substantially perpendicular to the mesh partition, the screen being configured to support decomposable organic material in the interior of the container; and
   a cover attached to the container sized to cover the entire opening at the top of the first region or second region but for a cutout region, said cutout region configured to be coverable with a cutout cover or a gardening pot to selectively allow access to one of the first and second regions of the interior, and with said cover operable between a first position and a second position to selectively allow light to one of the first and second regions responsive to decomposition of the decomposable organic material;
   wherein in the first position the cover covers the first region completely uncovers the second region, and exposes substantially all of the second region to light, and in the second position the cover covers the second region and completely uncovers the first region, and exposes substantially all of the first region to light; and
   the mesh partition comprising an aperture configured to permit a composting animal to pass directly from the first region to the second region when the first and second regions contain decomposable organic material.

2. The apparatus of claim 1, further comprising:
   at least two opposing legs, each of the two opposing legs including an inward slot extending substantially parallel to an interior wall of the container, the inward slot sized to receive and support a drip pan.

3. The apparatus of claim 1, further comprising: a drip pan for receiving moisture from the interior of the container.

4. The apparatus of claim 3, wherein the screen includes at least one aperture sized to permit fluid to pass from the interior, through the at least one aperture, to the drip pan.

5. The apparatus of claim 1, wherein the cover comprises:
   a first cover corresponding to the first region; and
   a second cover corresponding to the second region.

6. The apparatus of claim 5, wherein the first cover and the second cover are pivotally attached to the container.

7. The apparatus of claim 1 wherein the composting animal is a worm.

8. The apparatus of claim 7 wherein the composting animal is a worm of the species *Eisenia Foetida*.

9. An apparatus for facilitating breakdown of organic material comprising:
   a container including an interior and an opening for access to the interior, the interior including a plurality of regions arranged side-by-side each configured to contain decomposable organic material;
   a mesh partition separating one of the first or second regions from another region, the partition comprising a frame forming a perimeter of the partition and a mesh screen disposed within the frame and forming an interior of the partition;
   a screen at the bottom of the one of the plurality of regions and disposed substantially perpendicular to the mesh partition, the screen being configured to support decomposable organic material in the interior of the container; and a cover attached to the container sized to cover the entire opening at the top of one of the plurality of regions but for a cutout region, said cutout region configured to be coverable with a cutout cover or a gardening pot to selectively allow access to one of the first and second regions of the interior, and with said cover selectively operable between a first position and a second position, wherein in the first position the cover covers one of the plurality of regions and completely uncovers one of the plurality of regions, exposing substantially all of the region uncovered to light, and in the second position the cover covers a different region and completely uncovers the region covered in the first position exposing substantially of the region covered in the first position to light;

wherein the mesh partition comprises an aperture configured to permit a composting animal to pass directly from one of the plurality of regions to another of the plurality of regions when the two regions contain decomposable organic material.

10. The apparatus of claim 9 wherein the container comprises an interior wall defining the interior and notches on opposing sides of said interior wall, wherein the partition is slideably engaged in said opposing notches.

11. The apparatus of claim 10 wherein the opposing notches comprise a locking mechanism for maintaining the orientation of the partition.

12. The apparatus of claim 9, further comprising:
at least two opposing legs, each of the two opposing legs including an inward slot extending substantially parallel to the interior wall of the container, the inward slot sized to receive and support a drip pan.

13. The apparatus of claim 12, further comprising: a drip pan for receiving moisture from the interior of the container.

14. The apparatus of claim 13, wherein the screen includes at least one aperture sized to permit fluid to pass from the interior, through the at least one aperture, to the drip pan.

15. A method of causing the composting animal to migrate after composting utilizing the apparatus as set forth in claim 1, said method comprising:
providing decomposable organic material in the first region of the interior of the container;
providing the composting animal in the first region;
covering at least the first region to inhibit light from entering at least the first region for facilitating decomposition; and
upon completion of decomposition of at least some of the decomposable organic material, causing the composting animal to migrate from the first region to an adjoining region.

16. The method of claim 15, wherein causing the composting animal to move from the first region to the adjoining region comprises:
causing the composting animal to migrate from the first region, through the aperture in the partition separating the first region and the adjoining region, to the adjoining region.

17. The method of claim 15, upon completion of decomposition of at least some of the decomposable organic material, further comprising:
inhibiting light in the adjoining region; and
permitting light in the first region.

18. The method of claim 17, wherein causing the composting animal to migrate from the first region to the adjoining region is performed responsive to inhibiting light in the adjoining region.

19. The method of claim 15, further comprising:
inhibiting light in the first region and the adjoining region.

20. The method of claim 15, further comprising:
providing decomposable organic material in the adjoining region while denying decomposable organic material in the first region;
wherein causing the composting animal to migrate from the first region to the adjoining region is performed responsive to providing decomposable organic material in the adjoining region while denying decomposable organic material in the first region.

* * * * *